United States Patent [19]

Otto

[11] 4,427,242
[45] Jan. 24, 1984

[54] UNITIZED TAPERED ROLLER BEARING

[75] Inventor: Dennis L. Otto, Malvern, Ohio

[73] Assignee: Atlantic Richfield Company, Los Angeles, Calif.

[21] Appl. No.: 342,826

[22] Filed: Jan. 26, 1982

[51] Int. Cl.³ .................... F16C 33/72; F16C 33/36
[52] U.S. Cl. ......................... 308/187.2; 308/214; 308/DIG. 10
[58] Field of Search ............... 308/187.2, 201, 208, 308/212, 214, 217, 218, DIG. 10, 213

[56] References Cited

U.S. PATENT DOCUMENTS

| | | | |
|---|---|---|---|
| 2,622,944 | 12/1952 | Bergstrom | 308/214 X |
| 3,425,758 | 2/1969 | Scheifele | 308/187.2 |
| 3,790,238 | 2/1974 | Otto | 308/187.1 |
| 3,975,066 | 8/1976 | Hofmann et al. | 308/201 |
| 4,203,635 | 5/1980 | Reiter | 308/213 |
| 4,317,601 | 3/1982 | Faigley | 308/214 X |
| 4,325,591 | 4/1982 | Otto | 308/187.2 |

Primary Examiner—Stuart S. Levy
Assistant Examiner—Thomas R. Hannon
Attorney, Agent, or Firm—Nilsson, robbins, Dalgarn, Berliner, Carson & Wurst

[57] ABSTRACT

A double row tapered roller bearing that is unitized for handling purposes is suited for installation over the drive flange of a front wheel drive automobile. The bearing includes a double cup, a pair of cones, tapered rollers arranged in two rows between the cup and cones, cages along each row of rollers, and seals at the ends of the cup. The seals have cases which are pressed into the ends of the cup and also have seal elements which contact the cones. Relatively little radial clearance exists between the press fitted portion of the seal case and the ring at the large end of the cage. Should a withdrawal force be applied to either one of the cones, such as when an attempt is made to strip a wheel flange from the bearing, the rollers of one row will drive the large end ring of the cage against the seal case so that the withdrawal force is transmitted through the cage to the case. Since the cage is closely confined by the press fitted portion of the seal case, the cage does not buckle significantly or fracture.

7 Claims, 4 Drawing Figures

WITHDRAWAL FORCE

UNITIZED TAPERED ROLLER BEARING

BACKGROUND OF THE INVENTION

This invention relates in general to antifriction bearings and more particularly to an antifriction bearing that can withstand large parting forces in the axial direction.

With the advent of front wheel drive automobiles, automobile manufacturers have discovered that double row tapered roller bearings that are preset, sealed, and unitized are ideally suited for the front wheel assemblies of their automobiles. In this regard, front wheel drive automobiles are generally lighter than their rear wheel drive counterparts, but most of the weight is concentrated over the front wheels—indeed significantly more than in comparable rear wheel drive automobiles. This makes double row tapered roller bearings of compact envelope size ideally suited for front wheel drive automobiles, because such bearings are capable of carrying large radial loads as well as substantial thrust loads in both axial directions, all with a high degree of stability in a small space.

Automobile manufacturers find it convenient to have the bearings preset and unitized for handling purposes as well as prelubricated and sealed. This facilitates assembly of the front wheel units, for it avoids handling a multitude of bearing parts, and further eliminates all of the adjusting and lubricating problems.

In the typical front wheel drive assembly equipped with a tapered roller bearing, a double row bearing is used instead of two single row bearings as are often found in the front wheels of rear wheel drive automobiles. The double row bearing includes a double cup, that is a single cup or outer race having two raceways on it, which fits into a steering knuckle. The bearing also includes two cones which fit into the double cup from opposite ends and form an inner race. Of course there is a single row of tapered rollers between each cone and the cup, the rollers of each row being in the indirect orientation, that is with their large diameter ends presented outwardly away from the center of the bearing. The cones fit onto a drive flange, there being an interference fit between the cones and the drive flange to insure maximum stability. A powered drive axle extends through the drive flange, and a nut threads over the end of the axle to clamp the drive flange and the two cones on it together.

While double row bearings are, by reason of their unitized construction, easily installed in the front end units, they are difficult to remove without damaging them. The difficulty derives from the friction fit between the cones and the drive flange, for the outboard cone tends to remain with the drive flange as the drive flange is stripped from the bearing. Indeed, the outboard cone drives the rollers of the outboard row against the cage which in turn jams against the seal case or some structural member within the mounting, and the seal is usually damaged to the extent that the bearing is thereafter unable to operate satisfactorily. In the case of polymer cages, they will usually buckle under the thrust load that is transmitted through them and as a result may fracture. If this occurs, the rollers will damage the seal case and seal lips. Steel cages will on the other hand bend out of shape, permitting the rollers to contact and damage the seal.

Also, should the wheel nut be removed and the vehicle rolled about, as may occur during some servicing procedures, the cones of the bearing will tend to spread, due to the tapered geometry in the bearing, and may "walk off" of the drive flange. Thus it is desirable to construct the wheel unit and bearing so that this does not occur.

SUMMARY OF THE INVENTION

One of the principle objects of the present invention is to provide a bearing that is unitized for handling purposes by a seal attached to one of its races by a press fit. Another object is to provide a bearing of the type stated that can withstand large parting forces at its inner races without being damaged. A further object is to provide a bearing of the type stated in which the parting forces are transmitted through a cage of the bearing. An additional object is to provide a bearing of the type stated in which the cage may be formed from a polymer. Still another object is to provide a bearing of the type stated in which the seal case surrounds and confines the cage when an axial stripping force is transmitted through it so as to prevent the cage from buckling. Yet another object is to provide a bearing of the type stated which is in the configuration of a tapered roller bearing. A further object is to provide a bearing of the type stated which is ideally suited for use at the front wheel locations of front wheel drive automobiles. These and other objects and advantages will become apparent hereinafter.

The present invention is embodied in a bearing having an outer race, a row of rolling elements along the outer race, an inner race along which the rolling elements also extend, with the inner race being configured such that it will force the rolling elements in one direction if the inner race is moved in that direction, a cage for maintaining the proper spacing between the rolling elements and having an end ring that projects beyond the rolling elements in the direction that the inner race will move the rolling elements, an abutment mounted opposite the end ring, and a confining surface that will prevent the end ring and cage from buckling excessively after the end ring is forced into the abutment so that the cage will transmit the force to the abutment without breaking. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
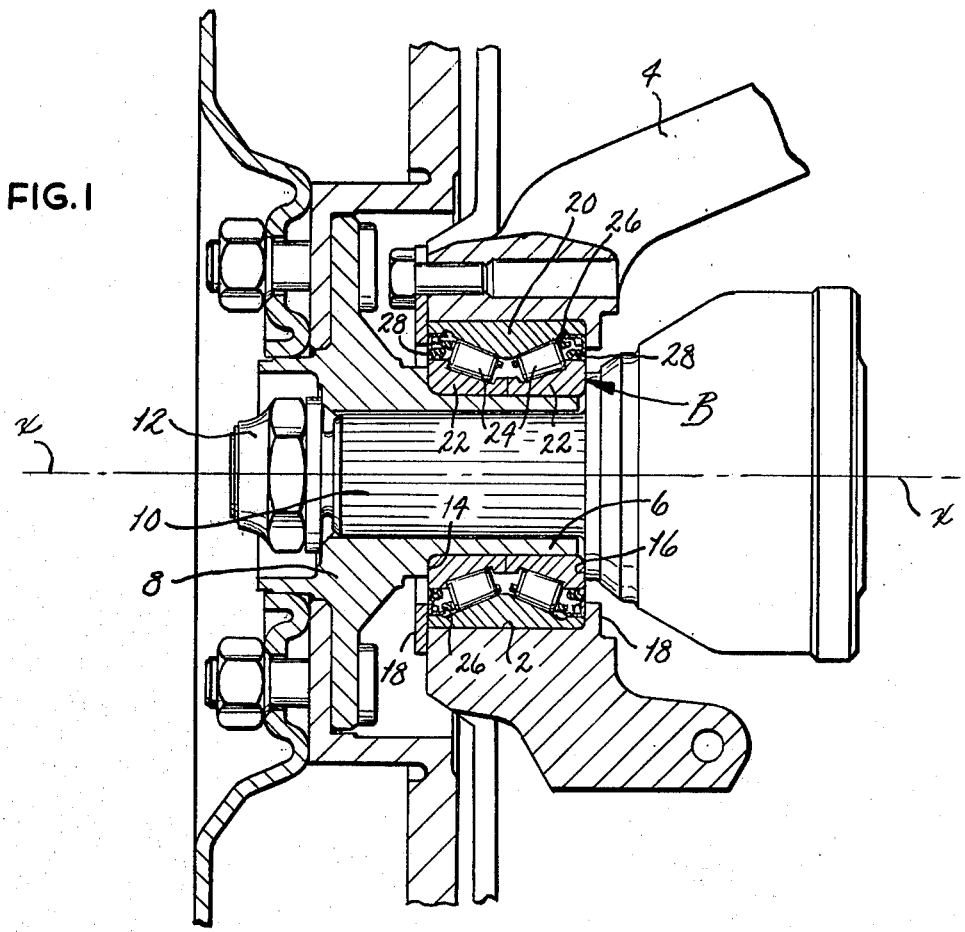
FIG. 1 is a sectional view of a front wheel drive assembly provided with a tapered roller bearing constructed in accordance with and embodying the present invention.

Referring now to the drawings (FIG. 1), B designates a tapered roller bearing that is particularly suited for use as a front wheel bearing for a front wheel drive automobile. As such it fits into a bore 2 within a steering knuckle 4 and around a hollow spindle 6 on a drive flange 8, so that the drive flange 8 can rotate relative to the knuckle 4. The bearing B, of course, permits a wheel on the drive flange 8 to rotate relative to the knuckle 4 and transmits radial loads, as well as axial loads in both directions, from the knuckle 4 to the drive flange 8. The drive flange is driven by a splined axle 10 which fits into the hollow spindle 6 and the two are held together, with the bearing B clamped between them, by a nut 12 that threads over the end of the axle 10 and against the outwardly presented face of the drive flange 8. In this regard, the drive flange 8 has a shoulder 14 located at the end of its spindle 6, while the axle 10 also has a shoulder 16. The two shoulders 14 and 16 face each other and are located at opposite ends of the bearing B, so that when the nut 12 is turned down, the shoulders 14 and 16 draw together and clamp the bearing B tightly between them. The bore 2, the drive flange 8, and the axle 10 all have a common axis X which is also the axis of rotation for the bearing B. To keep the bearing B within the bore 2 of the knuckle 4, the latter is provided with retaining elements 18 which may take the form of a shoulder and clamping plate (as illustrated), snap rings, or the like.

The bearing B basically includes (FIG. 1) an outer race in the form of a double cup 20, an inner race in the form of a pair of cones 22 located within the cup 20, rolling elements in the form of tapered rollers 24 arranged in two rows with a single row of rollers 24 surrounding each cone 22, a cage 26 for each row of rollers 24 to maintain the proper spacing between the rollers 24, and seals 28 at the ends of the cup 20 for closing the annular spaces between the ends of the cup 20 and cones 22. Each cone 22, its complement of rollers 24, and its cage 26, are known as a cone assembly.

The double cup 20 fits snugly within the bore 2 of the steering knuckle 4 (FIG. 1), and indeed an interference fit exists between the two. Nevertheless the knuckle 4 is provided with the retaining elements 18 to ensure that the cup 20 remains in the bore 2. The cup 20 has a pair of inwardly presented raceways 30 (FIG. 2) which taper outwardly away from the center of the bearing B so that the large diameter ends of the raceways 30 are located toward the ends of the cup 20. Beyond each raceway 30 the cup 20 is provided with a cup extension 32 having a short end bore 34 that is greater in diameter than the large end of the raceway 30 and opens out of the cup 20 at a slight chamfer 35. The diameter of the end bores 34 is also greater than the inside diameter of the retaining elements 18 so that the elements 18 project radially inwardly past the surfaces of the bores 34. Each cup extension 32 is further provided with an annular groove or undercut 36 that is larger in diameter than the end bore 34 and separates the bore 34 from the adjacent raceway 30.

The two cones 22 are pressed over the hollow spindle 6 on the drive flange 8 and are located within the double cup 20 (FIG. 1). Each has an outwardly presented raceway 38 (FIG. 2) that is located opposite to one of the raceways 30 of the cup 20. The cone raceways 38 taper downwardly toward each other, so that the large diameter ends of the raceways 38 are at the ends of the bearing B. Each cone 22 at the large diameter end of its raceway 38 has a thrust rib 40 and at the small diameter end has a retaining rib 42. The thrust rib 40 projects axially within the cup extension 32 and has a cylindrical wear surface 44 (FIG. 2) that is presented outwardly. The back face for each cone 22 is on its thrust rib 40, and accordingly the back face for one cone 22 abuts against the shoulder 14 of the drive flange 8, while the back face of the other cone 22 abuts against the shoulder 16 of the axle 10. The retaining ribs 42 for the two cones 22 project outwardly from their respective cone raceways 38 at a relatively steep angle on the order of a right angle. The front faces of the two cones 22 are on the retaining ribs 42 and abut midway between the ends of the cup 20.

The tapered rollers 24 are arranged in two rows between the corresponding raceways 30 and 38 of the cup 20 and cones 22, respectively (FIG. 1). Their taper corresponds to those of the raceways 30 and 38 so that generally line contact exists between the roller side faces and the raceways 30 and 38. This taper is on apex, meaning that the conical side faces of the rollers 24 of either row, if extended to their respective apexes, would have those apexes located at a common point along the axis X of the bearing B. The large diameter end faces of the rollers 24 around each cone 22 abut against the thrust rib 40 for that cone, and this prevents the rollers 24 from being expelled from the spaces between the opposed raceways 30 and 38. Since the axial spacing between the two cup raceways 30 is established by reason of the integral construction of the cup 20 and the axial spacing between the two cone raceways 38 and the two rows of rollers 24 is established by the abutment of the cones 22 at their front faces, the bearing B is preadjusted. Thus, the nut 12 merely clamps the cones 22 together, but does not control the adjustment, that is the end play or preload, in the bearing B.

The cages 26 maintain the proper spacing between the rollers 24 of their respective rows and prevent the rollers 24 from falling away from their respective cones 22 when the cones 22 are removed from the cup 20. Each cone 22, its complement of rollers 24, and its cage 26, when held together by the cage 26, is known as a cone assembly.

The cages 26 may be molded from a polymer and in general may possess the configuration of the cage disclosed in U.S. Pat. application Ser. No. 135,693 of C. W. Faigley, Jr., filed Mar. 31, 1980, now U.S. Pat. No. 4,317,601, and entitled Polymer Cage for a Tapered Roller Bearing. The cages 26 may also be stamped from metal, even light weight metal. In any event, because of the construction of the bearing B, they are capable of transmitting high thrust loads caused by parting forces at the cones 22.

Each cage 26 includes a large diameter end ring 46 (FIG. 2) that encircles the thrust rib 40 for its cone 22 immediately beyond the large diameter ends of the tapered rollers 24 for that cone 22, a small diameter end ring 48 that encircles the cone retaining rib 42 immediately beyond the small ends of the rollers 24, and bridges 50 which extend between the tapered sides of the rollers 24 and are attached at their ends to the large and small end rings 46 and 48, thereby creating pockets in which the rollers 24 are confined. The bridges 50 for the most part lie beyond the pitch circle for the rollers 24, that is beyond the imaginary cone formed by centerlines of all of the rollers 24, and are furthermore beveled along their side faces so that they generally conform to the sides of the rollers 24 which they separate. This keeps the rollers in place around the cone 22 when the cone 22 is removed from the cup 20. Aside from that, the bevels on the bridges 50 serve to properly locate the cage 26 in the radial direction 30 so that it more-or-less floats within the complement of rollers 24 as the set of rollers 24 revolves in the annular space between the cup and cone raceways 30 and 38. Thus, the cage 26 remains properly positioned with its bridges 50 generally beyond the pitch circle, yet spaced inwardly from the cup raceway 30. The large end ring 46 has an outwardly presented surface 52 that is cylindrical and concentric to the axis X of rotation. It lies immediately inwardly from the surfaces of the end bore 34 and the undercut 36. Moreover, the end ring 46 terminates short of the back face for the cone 22, and indeed extends only about half the distance of the underlying wear surface 44 on the cone thrust rib 40.

If formed from a polymer, the cage 26 will be somewhat flexible and can be distorted radially at its end rings 46 and 48 with the application of relatively little force, assuming of course that the end rings 46 and 48 are otherwise free from confinement. Since a polymer cage 26 is flexible, it will deflect within the elastic limits of the material from which it is made, and this facilitates the installation of the rollers 24 and cage 26 over the small retaining rib 42 of the cone 22 to complete the cone assembly.

The seals 28 (FIG. 2) close the annular spaces between the cup extensions 32 and the cone thrust rib 40 at each end of the bearing B to both retain a lubricant within the interior of the bearing B and to further exclude dust, water, and other contaminants from the enclosed region. In addition, the seals 28 unitize the bearing B for handling purposes in that they prevent the cones 22, or more accurately, the cone assemblies, from being withdrawn from the cup 20, even when the cones 22 are subjected to vigorous jars as might occur during shipment or immediately prior to the installation of the bearings B in the bores 2 of a steering knuckle 4.

More particularly, each seal 28 includes a seal case 54 that is fitted to the cup 20 at one end of the bearing B and a flexible seal element 56 which is bonded to the case 54 and bears against the underlying wear surface 44 on the thrust rib 40 for the cone 22 that is at that particular end of the bearing B. In cross-section, the seal case 54 possesses an L-shaped configuration, it having an axially directed wall 58 that fits into the end bore 34 of the cup 20 and a radially directed wall 60 that extends inwardly from the axial wall 58, but is narrower than the annular space between the cup 20 and cone 22, so that it does not contact the wear surface 44 of the thrust rib 42. The outside diameter of the axial wall 58 is slightly greater than the diameter of the end bore 34, so that an interference fit exists between the wall 58 and the bore 34, and indeed the seal case 54 is pressed into the bore 34, the chamfer 35 at the end of the bore 34 serving to initially center the axial wall 58 and guide it into the bore 34. Indeed, the free end of the axial wall 58 is slightly reduced in thickness to facilitate its entry into the end bore 34. The axial wall 58 is slightly shorter in length than the combined axial dimensions of the chamfer 35, the end bore 34, and the undercut 36. When the seal case 54 is properly installed in the bore 34, the radial wall is set slightly inwardly from the end face of the cup 20, yet the reduced free end of the axial wall 58 does not extend to the end of the undercut 36. The seal case 54 is preferably stamped from steel, although any substance that is reasonably rigid and will not deteriorate in the presence of lubricants will suffice.

The flexible seal element 56 (FIG. 2) is, on the other hand, formed from an elastomer, preferably in a molding operation, and indeed is molded directly against the radial wall 60 of the seal case 54. It extends axially inwardly from the radial wall 60 and includes a sealing lip 62 and a dust lip 64, both of which bear against the cylindrical wear surface 44 of the cone thrust rib 40 for the full circumference of that surface. The sealing lip 62 is located closer to the rollers 24 than the dust lip 64 and prevents the bearing lubricant from escaping. The dust lip 64 serves primarily to exclude contaminants from entering the interior of the bearing B.

While the flexible element 56 extends axially from the radial wall 60 in the same direction as does the axial wall 58 of the seal case 54, it is spaced inwardly from the axial wall 58, so that an annular region 66 exists between the axial wall 58 and the sealing element 56. The large diameter end ring 46 of the cage 26 projects into this region and when the bearing is in its normal operating condition (FIG. 2), the cylindrical outer surface 52 of the large end ring 46 for the cage 26 is located quite close to the axial wall 58 of the seal case 54, there being a clearance h between the two. For a typical automotive bearing B the clearance h ranges between 0.001 and 0.010 inches. In any event, the large end ring 46 of the cage 26 is located close enough to the axial wall 58 of the seal case 54 to enable the axial wall 58 to confine the end ring 46 should the end ring 46 tend to deform or buckle as might occur if a thrust load, that is an axially directed force, is applied to and transmitted through the cage 26.

Figure 2:
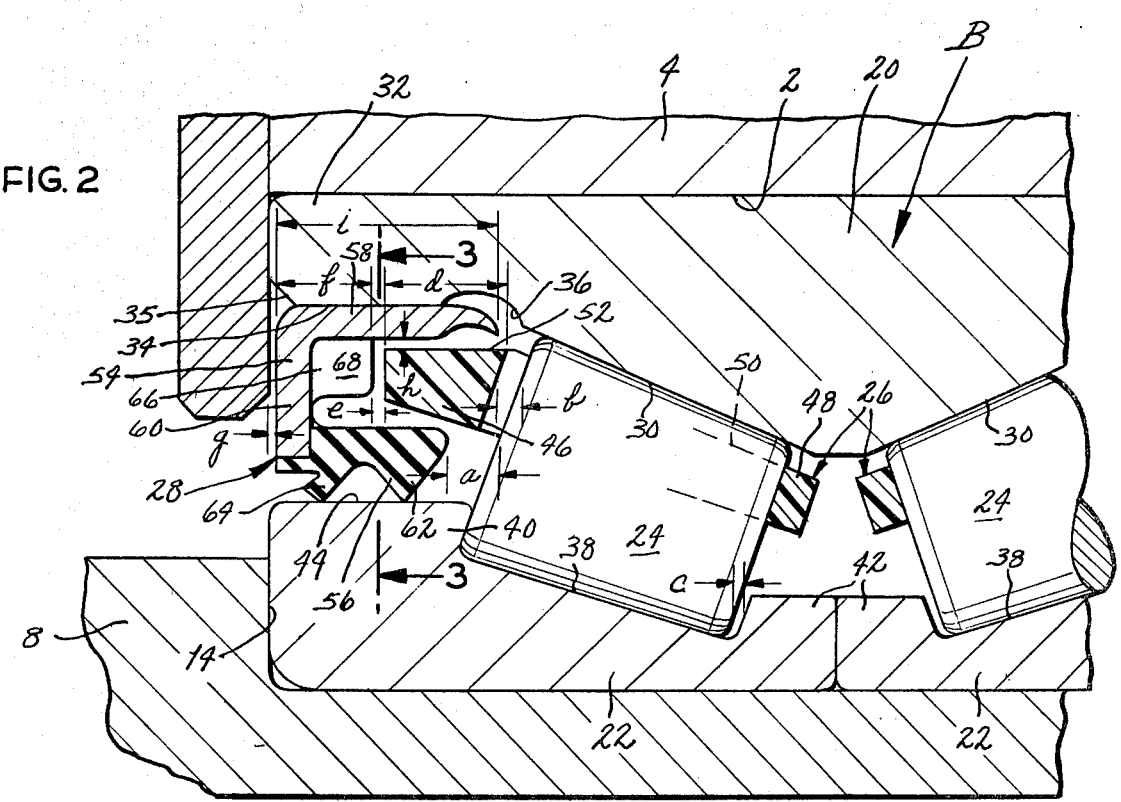
FIG. 2 is an enlarged sectional view of the bearing in its normal operating condition.
Figure 3:
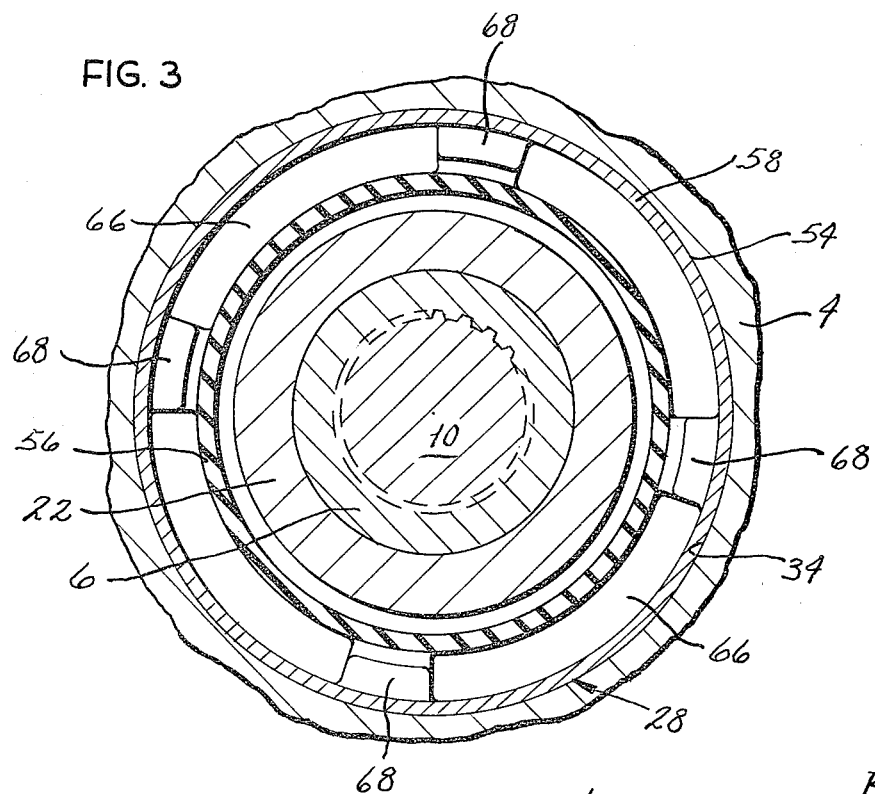
FIG. 3 is a sectional view taken along line 3—3 of FIG. 2 and showing the chaplets opposite to which the cage on the cone assembly is mounted.

In addition to the seal element 56, the seal case 54 contains several pads or chaplets 68 (FIGS. 2 & 3) that are likewise formed from an elastomer and are bonded to the inwardly presented faces of the axial and radial walls 58 and 60 at equal intervals around the seal case 54. The chaplets 68, which may be formed integral with the seal element 56, project into the annular region 66 and have their end faces presented opposite to the end face of the large end ring 46 on the cage 26 (FIG. 2). Even so, during the normal operation of the bearing B, a clearance e exists between the large end ring 46 and the chaplets 68, and for a typical automotive bearing, this clearance should range between 0.005 and 0.050 inches. However, should the rollers 24 be thrust axially away from a seated condition with respect to the cup and cone raceways 30 and 38, as will occur if an attempt is made to withdraw the outboard cone 22 from the cup 20, the rollers 24 will drive the large end ring 46 of the cage 26 against the chaplets 68. Even so, the rollers 24 still do not contact the flexible seal element 56 for the combined thickness of the chaplets 68 and the large end ring 46 is greater than the axial extension of the seal element 56 from the radial wall 60 of the seal case 54. The force on the roller 24 may increase to the point that the cage 26 cannot withstand it without beginning to buckle at its large end ring 46. However, the end ring 46 will buckle only to the extent that comes against the axial wall 58 of the seal case 54 and that amount of buckling is not enough to cause a fracture to develop in the end ring 46 or, for that matter, in the remainder of the cage 26.

In considering the operation of the bearing B, several dimensions and clearances are important (FIG. 2). Those are—

(1) The axial distance a which is the minimum distance from the large diameter end faces of the rollers 24 to the free end of the flexible seal element 56.

(2) The end clearances b in the roller pockets for the cage 26 when considered as a truly axial dimension. In short, this is the difference between the length of the rollers 24 and the length of the cage pockets in which they are contained, translated of course to its axial component.

(3) The clearance c between the small ends of the rollers 24 and the retaining rib 42 when considered as an axial dimension. This is actually the axial component of the difference between the length of the cone raceway 38 and the length of the rollers 24.

(4) The minimum width d of the large diameter end ring 46 for the cage 26 measured along the surface 52, and also the tolerance Δd in that dimension.

(5) The minimum operating clearance e between the end of the large end ring 46 for the cage 26 and the chaplets 68.

(6) The minimum seal width f measured at the chaplets 68 or, more accurately, the distance between the end face of the cup 20 and those faces of the chaplets 68 that are presented inwardly toward the cage 26.

(7) The axial clearance g between the retaining element 18 and the radial wall 60 of the seal case 54.

(8) The radial clearance h between the axial wall 58 of the seal case 54 and the cylindrical surface 52 of the large end ring 46 for the cage 26.

(9) The maximum length i for the axial wall 58 of the seal case 54.

In general it is desirable to maintain the following relationships between the foregoing dimensions and clearances:

$$a > b + \Delta d + e$$

$$i < f + d$$

During normal operation of the bearing B (FIGS. 1 & 2), the nut 12 that is threaded over the axle 10, in effect, holds the two cones 22 together such that they abut at their front faces. In this condition, the bearing B should have the correct adjustment, that is the proper amount end play or preload, whatever the case may be. The double cup 20, on the other hand, is held between the two retaining elements 18, within the steering knuckle 4. Thus, the drive flange 8, when torque is applied to the axle 10, will rotate freely within the steering knuckle 4. Under these circumstances, the cages 26 merely serve to maintain the proper circumferential spacing between the tapered rollers 24 of the two rows. Of course, during assembly of the bearing B, the cages 26 further hold the rollers 24 around the cones 22 to unitize the cone assemblies that are formed. In this regard, the entire bearing B is also supplied as a unitized assembly, it being held together by the seals 28 which block the large ends of the rollers 24 and prevent the cones 22 from moving out of the cup 20. Thus, the bearing B may be, and indeed is, installed in the bore 2 of the steering knuckle 4 and over the hollow spindle 6 of the drive flange 8 as a unit.

During certain maintenance procedures it may be necessary to separate the drive flange 8 and the bearing B, this being achieved by removing the nut 12 and pulling or "stripping" the drive flange 8 from the two cones 22 for the bearing B. Since a friction fit exists between each cone 22 and the drive flange 8 around which it exists, the two cones 22 tend to remain with the spindle 6 as the drive flange 8 is withdrawn.

The inboard cone 22, however, is prevented from moving through the cup 20 by the tapered geometry of the bearing B. In other words, as the inboard cone 22 is urged toward the outboard end of the bearing B, the tapered rollers 24 of the inboard row seat firmly against the tapered raceways 30 and 38 of the cup 20 and inboard cone 22, thereby preventing movement of that cone. Thus, the hollow spindle 6 merely slides through the inboard cone 22.

Figure 4:
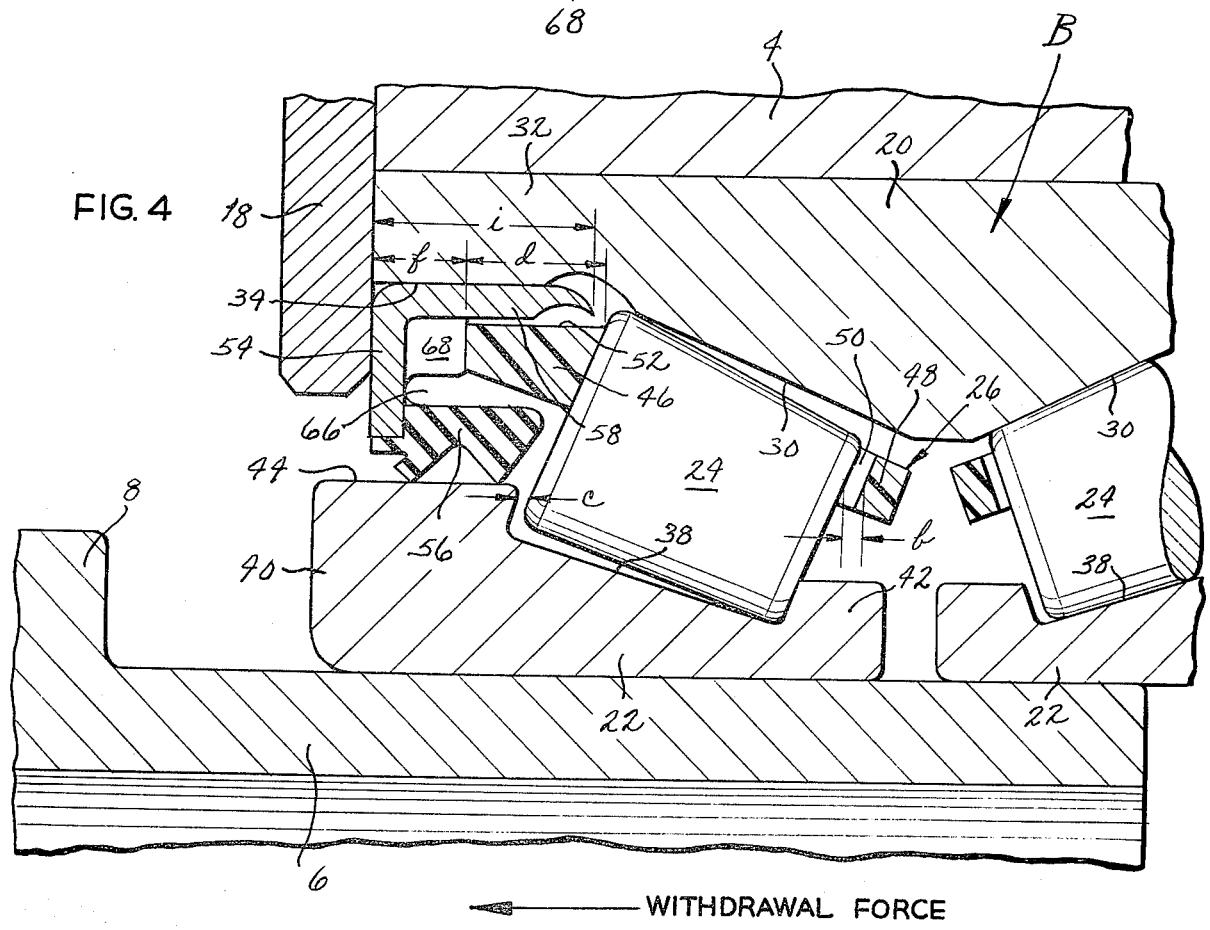
FIG. 4 is an enlarged sectional view similar to FIG. 2, but showing the bearing in the condition that it assumes when the drive flange is stripped from the bearing.

The outboard cone 22, however, remains with the hollow spindle 6 as the spindle 6 is withdrawn from the knuckle 4 (FIG. 4). Thus, the clearance c between the small ends of the rollers 24 and the retaining rib 42 for the outboard cone 22 is eliminated and the withdrawal force is thus exerted on the rollers 24. Also, the clearance e at the end of the outboard cage 26 is eliminated and the large end ring 46 of the cage 26 comes against the chaplets 68. Thereafter, the clearance b between the large ends of the rollers 24 and the end ring 46 is taken up, so that the withdrawal force is transferred through the large end ring 46 of the cage 26 to the chaplets 68. In short, the force exerted on the outboard cone 22 is transmitted through the retaining rib 42 of that cone to the rollers 24 of the row that surrounds the outboard cone 22. The rollers 24 in turn transmit the force to the large end ring 46 of the cage 26 which in turn bears against the chaplets 68 of the outboard seal 28. Since the chaplets 68 are on the seal case 54, the axially directed force is applied to the seal case 54, and if it is strong enough to overcome the friction between the axial wall 58 of the seal case 54 and the outboard end bore 24 of the double cup 20, the outboard seal 28 will move axially through the clearance g. However, the frictional force that holds the outboard cone 22 in place may be less than that which holds the seal case 54 in place, in which case the drive flange spindle 6 will slide out of the outboard cone 22.

In either case, a substantial thrust load is applied to the cage 26 at its large diameter end ring 46, but since the radial clearance h between the end ring 46 and the axial wall 58 of the seal case 54 is quite small, the end ring 46 cannot expand or buckle to any significant extent. Indeed, any buckling is confined to extremely small proportions by the axial wall 58 of the seal case 54, and this buckling is not sufficient in magnitude to crack or otherwise damage the end ring 46 or the remainder of the outboard cage 26, assuming that the cage 26 is molded from a polymer. If it is stamped from a metal, the buckling is not enough to exceed the elastic limits or yield point of the metal. Furthermore, the chaplets 68, being made from an elastomer, prevent stress concentrations from developing within the large end ring 46 of the cage 26, and this further serves to preserve the integrity of the cage 26.

Not only does the outboard cage 26 enable the drive flange 8 to be stripped from the bearing B without any damage to the bearing B, but it further prevents the hub 8, and the wheel that is on it, from separating from the bearing B if the nut 12 is removed and the vehicle, of which the steering knuckle 4, the drive flange 8 and the bearing B, form a part, is moved about. In this regard, the geometry of the tapered roller bearing B, as with any other tapered roller bearing of similar configuration, is such that the cones 22 will be urged apart on the presence of a radial load applied to the bearing B. This derives from the fact that radial loads translate into both radial and axial components at the rollers 24, and the axial components force the cones 22 apart. Were it not for the seal cases 54, the holding force of the press-fitted cones 22, and the retaining elements 18, the bearing B could come apart under these circumstances and the drive flange 8 would leave the axle 10.

In lieu of the abutment surface for the cage end rings 46 being on individual chaplets 68, they may be on a continuous ring or pad that is molded against the radial wall 60 of the seal case 54. Also, the abutment surfaces for the end rings 46 may be merely the radial walls 60 of the seal case 54, in which case it may be desirable to form the radial wall in a stepped configuration. Moreover, the large end ring 46 of the outboard cage 26 may be confined by a surface that is located beyond the cup of the bearing, and that surface need not be part of a seal case.

This invention is intended to cover all changes and modifications of the example of the invention herein chosen for the purposes of the disclosure which do not constitute departures from the spirit and scope of the invention.

What is claimed is:

1. An antifriction bearing arrangement comprising:
   (a) an outer race having an inwardly presented raceway;
   (b) a row of rolling elements along the raceway of the outer race, said rolling elements being tapered between large diameter and small diameter ends;
   (c) an inner race having an outwardly presented raceway along which the rolling elements likewise extend, the inner race being configured adjacent its ends with a thrust rib and a retaining rib embracing the large and small diameter ends respectively of the rolling elements at substantially right angles such, if moved in one axial direction with respect to the outer race, it will cause the rolling elements to seat firmly against the inner and outer raceways, and if moved in the opposite axial direction the retaining rib will force the rolling elements in the direction that it is moved;
   (d) a cage formed of a plastic material positioned between the outer and inner races, the cage being configured to maintain the rolling elements in spaced positions, and the cage having an end ring that projects beyond the large diameter ends of the row of rolling elements in said opposite axial direction;
   (e) abutment means disposed in the bearing arrangement in fixed position opposed to the end ring of said plastic cage and spaced from the end ring with an operating clearance, such that the inner race, if moved far enough in said opposite direction, will move the retaining rib and rolling elements in an axial direction and cause the cage end ring to take-up the operating clearance and bear against the abutment; and
   (f) a seal case providing a confining surface mounted in a fixed position with respect to the outer race and surrounding the end ring of the cage, the seal case supporting the abutment means in the fixed position with its confining surface spaced from the plastic end ring for establishing an operating clearance between the end ring and the confining surface such that the latter surface will confine the end ring when the end ring is forced against the abutment and thereby prevent the cage from buckling significantly.

2. An antifriction bearing arrangement comprising:
   (a) an outer race having an inwardly presented raceway, the outer race containing an end bore that is located beyond the raceway of that race;
   (b) a row of rolling elements along the raceway of the outer race;
   (c) an inner race having an outwardly presented raceway along which the rolling elements likewise extend, the inner race being configured to taper from a large end to a small end such, if moved in one axial direction with respect to the outer race it will cause the rolling elements to seat firmly against the raceways, and if moved in the opposite axial direction, it will force the rolling elements in the direction that it is moved;
   (d) a cage between the outer and inner races and being configured to maintain the rolling elements in spaced positions, the cage having an end ring that projects beyond the row of rolling elements in said opposite axial direction;
   (e) an abutment mounted in a fixed position with respect to the outer race and opposite to the end ring of the cage with an operating clearance, such that the inner race, if moved far enough in said opposite direction, will cause the end ring to bear against the abutment; and
   (f) a confining surface mounted on the outer race in a fixed position with respect to the outer race and surrounding the end ring of the cage, the confining surface being an annular element that is forced into the end bore, the operating clearance between the end ring and the confining surface being such that the surface will confine the end ring when the end ring is forced against the abutment and thereby prevent the cage from buckling significantly, the annular element is part of a seal which includes a metal seal case and an elastomeric seal element that contacts the inner race and closes a space between the inner and outer races; the seal case having an axial wall that is the annular member and a radial wall, and the abutment is an elastomeric pad that is attached to the radial wall.

3. A bearing arrangement according to claim 2 wherein the inner race has a retaining rib at the small end of its tapered raceway, the retaining rib being configured to engage the ends of the rollers and force the rollers toward the abutment surface when the inner race is moved in said opposite direction with respect to the inner race.

4. A tapered roller bearing comprising:
   (a) a cup having a tapered inwardly presented raceway configured to provide large and small diameter ends and an end bore at the large diameter end of the raceway with the end bore opening out of the large diameter end of the cup;
   (b) a cone located within the cup and having an outwardly presented tapered raceway, and also a thrust rib at the large diameter end of the cone raceway and a retaining rib at the small diameter end of the cone raceway, with both ribs projecting outwardly from the cone raceway at substantially right angles to the raceway;
   (c) tapered rollers arranged in a row between the cup and cone and having side faces that roll along the cup and cone raceways, the large ends of the rollers being normally against the thrust rib and the small ends being adjacent to the retaining rib, whereby when the cone is urged axially out of the large end of the cup raceway, the retaining rib will contact the ends of the rollers and urge them in the same direction;

(d) a cage formed of plastic material and disposed between the cone and cup raceways and having pockets in which the rollers are received, the cage also having an end ring extended across the large ends of the rollers and projecting axially over the thrust rib; and (e) a seal having a case provided with an axial wall that is fitted snugly into the end bore of the cup, an abutment surface that is located beyond the end ring of the cage, and an elastomeric seal element that contacts the thrust rib, the abutment surface being positioned to have an operating clearance such that the end ring will bear against it after the cone and rollers are moved a short distance axially in the direction of the large end of the cup raceway, and an operating clearance spacing between the axial wall of the seal case and the large end ring being such that the axial wall will confine the large end ring and support the cage end ring from buckling significantly upon taking up the operating clearances when an axial force is applied to the cone in sufficient magnitude to urge it axially out of the large end of the cup raceway.

5. A tapered roller bearing comprising:

(a) a cup having a tapered inwardly presented raceway configured to have large and small diameter ends and an end bore at the large diameter end of the raceway with the end bore opening out of the large diameter end of the cup;

(b) a cone located within the cup and having an outwardly presented tapered raceway configured to have large and small diameter ends and also a thrust rib at the large diameter end of the cone raceway and a retaining rib at the small diameter end of the cone raceway, with both ribs projecting outwardly from the cone raceway;

(c) tapered rollers arranged in a row between the cup and cone end having side faces that roll along the cup and cone raceways, the large ends of the rollers being normally against the thrust rib and the small ends being adjacent to the retaining rib, whereby when the cone is urged axially out of the large end of the cup raceway, the retaining rib will contact the ends of the rollers and urge them in the same direction;

(d) a cage between the cone and cup raceways and having pockets in which the rollers are received, the cage also having an end ring extending across the large ends of the rollers and projecting over the thrust rib;

(e) a seal having a case provided with an axial wall that is fitted snugly into the end bore of the cup, an abutment surface that is located beyond the end ring of the cage, and an elastomeric seal element that contacts the thrust rib, the abutment surface being positioned such that the end ring will bear against it after the cone and rollers are moved a short distance axially in the direction of the large end of the cup raceway, the spacing between the axial wall of the seal case and the large end ring being such that the axial wall will confine the large end ring and prevent it from buckling significantly when an axial force is applied to the cone in sufficient magnitude to distort the cage, the seal case has another wall that is attached to and directed inwardly from the axial wall, and wherein the abutment surface and the elastomeric seal lip are on the other wall of the seal case, and further comprising elastomeric pads on the other wall of the seal case; and (f) wherein the abutment surface is on the pads.

6. A bearing according to claim 5 wherein the cone thrust rib has an outwardly presented wear surface that is within the end bore of the cup and the elastomeric sealing element contacts the cone along the wear surface.

7. A bearing according to claim 5 wherein elastomeric seal element projects into the region circumscribed by the end ring of the cage.

* * * * *

UNITED STATES PATENT AND TRADEMARK OFFICE
CERTIFICATE OF CORRECTION

PATENT NO. : 4,427,242
DATED : January 24, 1984
INVENTOR(S) : Dennis L. Otto

It is certified that error appears in the above-identified patent and that said Letters Patent is hereby corrected as shown below:

On the title page of the patent the Assignee should be changed from "Atlantic Richfield Company, Los Angeles, Calif." to "The Timken Company, Canton, Ohio".

On the title page of the patent the Attorney, Agent, or Firm should be changed from "Nilsson, robbins, Dalgarn, Berliner, Carson & Wurst" to "Gravely, Lieder & Woodruff".

Column 3, line 7, "flange is" should be changed to "flange 8 is".

Signed and Sealed this

Sixteenth Day of October 1984

[SEAL]

Attest:

Attesting Officer

GERALD J. MOSSINGHOFF
Commissioner of Patents and Trademarks